United States Patent
Hata

(10) Patent No.: US 8,957,554 B2
(45) Date of Patent: Feb. 17, 2015

(54) STEPPING MOTOR WITH POSITION REGULATION MEMBER

(75) Inventor: Masato Hata, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 307 days.

(21) Appl. No.: 13/495,268

(22) Filed: Jun. 13, 2012

(65) Prior Publication Data

US 2013/0002062 A1    Jan. 3, 2013

(30) Foreign Application Priority Data

Jun. 29, 2011  (JP) .................................. 2011-143995

(51) Int. Cl.
  *H02K 37/24*  (2006.01)
  *H02K 7/118*  (2006.01)
  *H02K 37/14*  (2006.01)

(52) U.S. Cl.
  CPC .............. *H02K 7/1185* (2013.01); *H02K 37/14* (2013.01); *H02K 37/24* (2013.01)
  USPC .... 310/49.55; 310/36; 310/49.08; 310/49.53; 310/112; 310/116; 335/272; 396/463

(58) Field of Classification Search
  CPC .... H02K 37/14; H02K 37/24; H02K 37/1185
  USPC .......... 310/36, 49.08, 49.53, 49.55, 116, 112; 396/463; 335/272
  IPC ..................................................... H02K 37/24
  See application file for complete search history.

(56) References Cited

U.S. PATENT DOCUMENTS

| | | | | |
|---|---|---|---|---|
| 4,899,073 | A | * | 2/1990 | Takeuchi et al. ............... 310/116 |
| 6,211,585 | B1 | * | 4/2001 | Sato et al. ................... 310/49.55 |
| 6,800,970 | B2 | * | 10/2004 | Aoshima ..................... 310/49.32 |
| 7,242,123 | B2 | * | 7/2007 | Miyawaki ................. 310/156.32 |
| 7,304,409 | B2 | * | 12/2007 | Horiike .......................... 310/112 |
| 7,375,446 | B2 | * | 5/2008 | Suzuki et al. .................... 310/86 |
| 7,637,116 | B2 | * | 12/2009 | Park ................................ 62/222 |
| 2004/0223755 | A1 | * | 11/2004 | Naganuma et al. ............ 396/463 |
| 2007/0159030 | A1 | * | 7/2007 | Naganuma et al. .......... 310/49 R |
| 2013/0002062 | A1 | * | 1/2013 | Hata .......................... 310/49.55 |

FOREIGN PATENT DOCUMENTS

| | | |
|---|---|---|
| JP | 6-038593 A | 2/1994 |
| JP | 8-182301 A | 7/1996 |
| JP | 10-164811 | 6/1998 |
| JP | 11-313474 A | 11/1999 |

* cited by examiner

*Primary Examiner* — John K Kim
(74) *Attorney, Agent, or Firm* — Carrier Blackman & Associates, P.C.; Joseph P. Carrier; William D. Blackman

(57) ABSTRACT

A stepping motor includes a stator, a rotor which is rotatable to the stator, a rotor-side position regulation part which is fixed to the rotor and is rotated together with the rotor, and a stator-side position regulation part which is fixed to the stator. The rotor includes a rotary shaft, and a rotor magnet which is mounted on an outer periphery of the rotary shaft. The rotary shaft is integrally formed with the rotor magnet by resin. The stator-side position regulation part includes a first stator-side position regulation part which contacts the rotor-side position regulation part at a first position to regulate a rotation of the rotor in one direction, and a second stator-side position regulation part which contacts the rotor-side position regulation part at a second position different from the first position to regulate a rotation of the rotor in an opposite direction to the one direction.

12 Claims, 14 Drawing Sheets

RELATED ART

STEPPING MOTOR WITH POSITION REGULATION MEMBER

BACKGROUND OF THE INVENTION

1. Field of the Invention

The present invention relates to a stepping motor, and more particularly, to a stepping motor for a meter.

2. Description of the Related Art

In a pointer type meter such as speedometer and engine tachometer for a vehicle or ship, a stepping motor for rotating a pointer (a stepping motor for a meter) is employed. In the stepping motor, a rotating angle of a rotor is obtained according to the number of pulses of pulse power. Thus, it is possible to rotate the pointer to an arbitrary position by attaching the pointer to the rotor of the stepping motor.

The pointer type meter includes a rotation regulation member which regulates the rotation of the rotor to stop the pointer at a zero position (original position) of an indicator board. The related-art rotation regulation member is disclosed in patent application publications as explained below, for example.

JP-A-H10-164811 discloses a stepping motor including a rotor, a pointer which is attached to the rotor, two sets of annular stator cores which are concentrically stacked to surround the rotor along a rotating direction and an annular plate which is arranged between the two sets of annular stator cores. A rotation regulation part having a protruding shape is provided on an inner periphery of the annular plate, and a contact part which partially protrudes in a circumferential direction is formed on an outer periphery of the rotor. The contact part contacts the rotation regulation part, so that the pointer is stopped at an original position.

JP-A-H8-182301 discloses an indicating device including an annular stator, a magnet rotor which is provided in the annular stator and a pointer which is attached to the magnet rotor. The magnet rotor includes a locking part which axially protrudes. A part to be locked, which protrudes from a bearing rotatably supporting a rotary shaft of the magnet rotor, and the locking part of the magnet rotor are engaged with each other, so that the pointer is stopped at an original position.

JP-A-H6-38593 discloses an indicating device including a stepping motor, a pointer and a stopper which are attached to a rotary shaft of the stepping motor and a stopper which is attached to a rear side of an indicator panel. When power is fed to the indicating device, the stepping motor rotates reversely in a zero point position direction of the pointer and the rotation is stopped by the two stoppers. Thereby, the pointer returns to a zero position.

JP-A-H11-313474 discloses an indicating device including a stepping motor, a pointer which is connected to an output shaft of the stepping motor and a stopper pin which is fixed on an indicator panel. When the stepping motor turns off, the stopper pin and the pointer are contacted to each other, so that the pointer is stopped at a predetermined position.

However, according to the above-explained stepping motors, it is not possible to regulate the rotation of the rotor in both directions at an arbitrary state, and therefore, the degree of freedom is low with respect to arrangements of the motor, the pointer and the like.

FIGS. 15 and 16 illustrate a method of regulating rotation of a rotor in a related-art stepping motor. FIGS. 15 and 16 show the stepping motor seen from one side in an extension direction of a rotary shaft (shaft 111).

Referring to FIG. 15, the stepping motor includes an annular stator 132 and a rotor 114 which is arranged in the stator. The stator 132 has annular stator teeth 132a which protrude in an inner diameter direction of the stator. A cylindrical rotor 114 configured by permanent magnets is provided with being opposed to the stator teeth 132a. The rotor 114 rotates about the shaft 111. From an axial end face (end face parallel to the paper sheet) of the stator 132, a stopper pin (stud) 162 convexly protrudes toward the rotor 114 in an axial direction (direction perpendicular to the paper sheet). From an axial end face of the rotor 114, a stopper 161 convexly protrudes toward the stator 132 in the axial direction. The rotor 114 and the stopper 161 integrally rotate about the shaft 111.

When the rotor 114 and the stopper 161 rotate in a CW direction (a counterclockwise direction in FIG. 15) and the stopper 161 reaches a position P1 (zero position), the stopper 161 contacts the stopper pin 162, so that the rotation of the rotor 114 in the CW direction is regulated. As a result, the rotation of the rotor 114 is stopped with the stopper 161 being at the position P1. By changing the position at which the stopper pin 162 is provided, it is possible to regulate the rotation of the rotor 114 in the CW direction at an arbitrary state.

Referring to FIG. 16, when regulating the rotation of the rotor 114 in a CCW direction (a clockwise direction in FIG. 16) with the stopper 161 being at a position P2, for example, it is necessary to move the stopper pin 162 to a position B. However, when the stopper pin 162 is moved to the position B, it is not possible to regulate the rotation of the rotor 114 in the CW direction with the stopper 161 being at the position P1.

The above problem occurs generally in the stepping motor, not only the stepping motor for a meter.

SUMMARY OF THE INVENTION

The present invention has been made in view of the above circumstances. Accordingly, it is an object of the present invention to provide a stepping motor having the high degree of freedom in arrangements of a motor, a pointer and the like.

Another object of the present invention is to provide a stepping motor which properly operates even when an attachment position of a pointer is at any of one side and the other side.

According to an illustrative embodiment of the present invention, there is provided a stepping motor comprising: a stator; a rotor which is rotatable with respect to the stator; a rotor-side position regulation part which is fixed to the rotor and is rotated together with the rotor; and a stator-side position regulation part which is fixed to the stator. The rotor includes: a rotary shaft; and a rotor magnet which is mounted on an outer periphery of the rotary shaft. The rotary shaft is integrally formed with the rotor magnet by resin. The stator-side position regulation part includes: a first stator-side position regulation part which contacts the rotor-side position regulation part at a first position to regulate a rotation of the rotor in one direction; and a second stator-side position regulation part which contacts the rotor-side position regulation part at a second position different from the first position to regulate a rotation of the rotor in an opposite direction to the one direction.

In the above stepping motor, the rotor-side position regulation part may include a protrusion part which is fixed to the rotary shaft and protrudes toward an outer diameter side of the rotary shaft.

In the above stepping motor, the rotor-side position regulation part may be provided at a side part of the rotor magnet in an extension direction of the rotary shaft.

In the above stepping motor, the stator may include an end plate which covers a side part of the rotor magnet in an extension direction of the rotary shaft, and the stator-side position regulation part may protrude from the end plate toward the rotor magnet.

In the above stepping motor, the stator-side position regulation part may be separately formed from the stator.

In the above stepping motor, the stator-side position regulation part may be integrally formed with the stator.

In the above stepping motor, when a coil of the stator is energized to stop a rotation of the rotor in a state where the rotor-side position regulation part is located at a closest position to the first position, the rotor-side position regulation part and the first stator-side position regulation part may be contacted to each other.

According to the above configuration, it is possible to provide the stepping motor having the high degree of freedom in arrangements of the motor, the pointer and the like. Also, according to the above configuration, it is possible to provide the stepping motor which properly operates even when the attachment position of the pointer is at any of one side and the other side.

DETAILED DESCRIPTION

Hereinafter, an illustrative embodiment of the present invention will be described with reference to the drawings.

Figure 1:
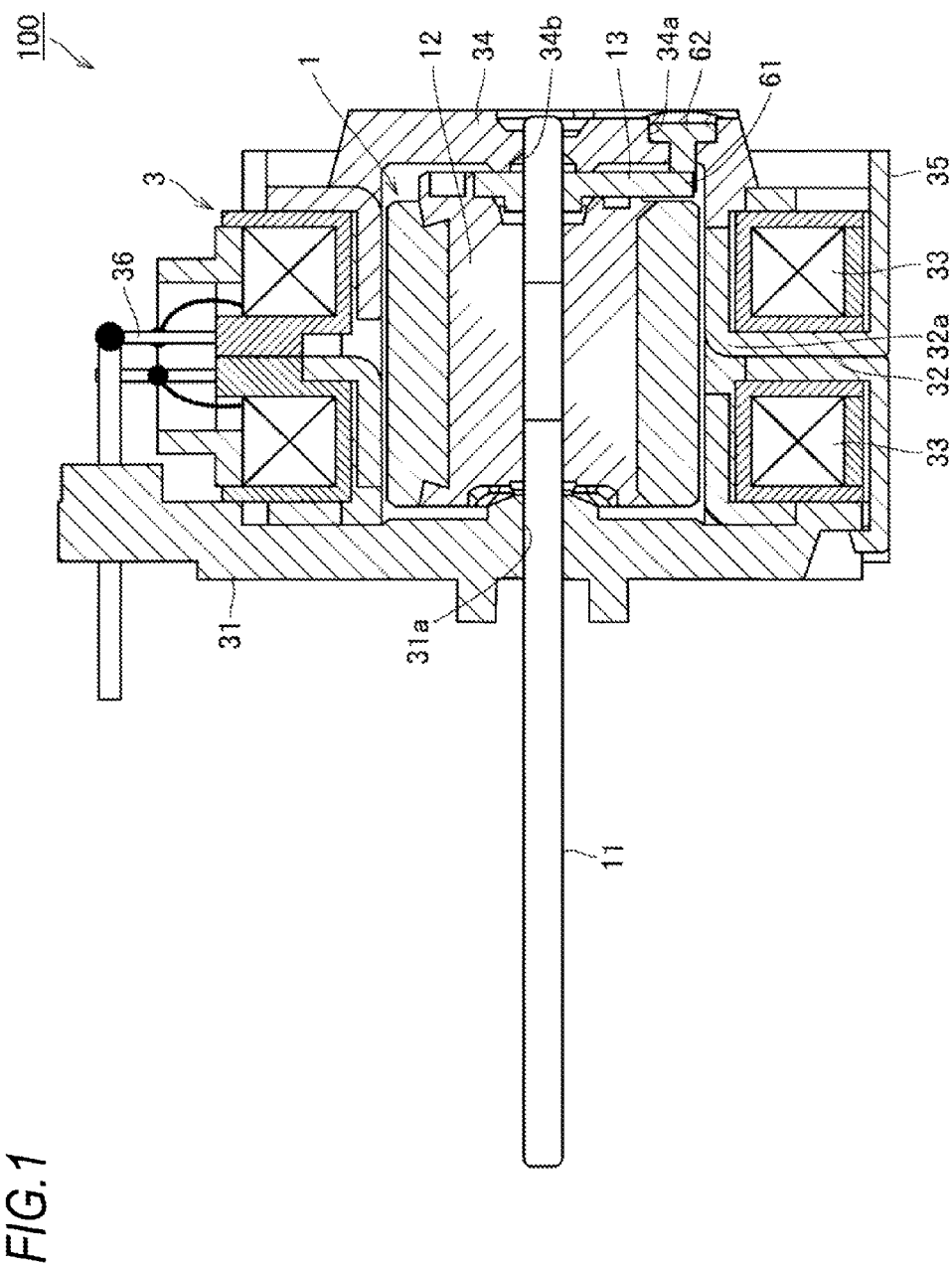
FIG. 1 is a sectional view schematically showing a stepping motor according to an illustrative embodiment of the present invention.

FIG. 1 is a sectional view schematically showing a stepping motor according to an illustrative embodiment of the present invention. In the below descriptions, an 'outer diameter side' refers to a side directing from a shaft 11 toward the outside and an 'inner diameter side' refers to a side directing from the outside toward the shaft 11. Also, a CW direction refers to a clockwise direction (a counterclockwise direction in FIGS. 5 to 10) when a stepping motor 100 is seen from a side (a left side in FIG. 1) at which the shaft 11 protrudes. A CCW direction refers to a counterclockwise direction (a clockwise direction in FIGS. 5 to 10) when the stepping motor 100 is seen from the side at which the shaft 11 protrudes.

Referring to FIG. 1, a stepping motor 100 of this illustrative embodiment is a stepping motor for a meter for rotating a pointer of a pointer type meter, for example. The stepping motor 100 mainly includes a rotor 1, a stator 3, a stop plate 13 and a stud 62 (a stator-side position regulation part, a zero position part, a stop part, a position regulation part, a stator-side rotation stopper, a convex part, a pin). The rotor 1 is rotatably supported by the stator 3. The stator 3 is arranged on an outer diameter side of the rotor 1.

The rotor 1 has a shaft (rotary shaft) 11 and a magnet assembly (rotor magnet) 12. The shaft 11 extends in a horizontal direction in FIG. 1 and the magnet assembly 12 is mounted on an outer periphery of the shaft 11 at the right side of FIG. 1. The magnet assembly 12 has a cylindrical shape and configured by a permanent magnet.

The stop plate 13 is fixed to the shaft 11 at a side part of the magnet assembly 12 (a side part in the extension direction of the shaft 11) at the right side of FIG. 1. A pointer (not shown) of the pointer type meter is attached to a left end portion of the shaft 11 in FIG. 1.

The stator 3 has a front plate 31, a plurality of teeth parts 32, a coil 33, an end plate (stator assembly resin) 34, a cylindrical wall part 35 and a terminal 36. The front plate 31 is circular and has a hole (bearing) 31a for rotatably supporting the shaft 11 at its central portion. The teeth parts 32 are formed to extend from the cylindrical wall part 35 toward an inner diameter side. The coil 33 is wound on the respective teeth parts 32. Tip end portions (the innermost portions) of the teeth parts 32 are formed with stator teeth (stator pole teeth) 32a. Each of the stator teeth 32a has a sectional area larger than that of a part of the teeth part 32 on which the coil is wound, when seen in FIG. 1. The terminal 36 is electrically connected to the coil 33 wound on the respective teeth parts 32, and power is fed to the coil 33 through the terminal 36. The end plate 34 is attached to the teeth parts 32 and covers the side part of the magnet assembly 12 (the side part in the extension direction of the shaft 11) at the right side of FIG. 1 and the stop plate 13. In other words, a space in which the magnet assembly 12 and the stop plate 13 are accommodated is configured by the front plate 31, the teeth parts 32 and the end plate 34. The end plate 34 is circular and has a hole (bearing) 34b for rotatably supporting the shaft 11 at its central portion. The stud 62 is fixed to the end plate 34 and protrudes from the end plate 34 toward the rotor-side (the left side in FIG. 1).

In the meanwhile, an attachment boss part for attaching an indicator board (a board for a meter) of the pointer type meter may be formed in the vicinity of the central portion of the front plate 31 (in the vicinity of the shaft 11). When the attachment boss part is formed, it is possible to easily perform the positioning (centering) of the stepping motor 100 with respect to the indicator board.

Figure 2:
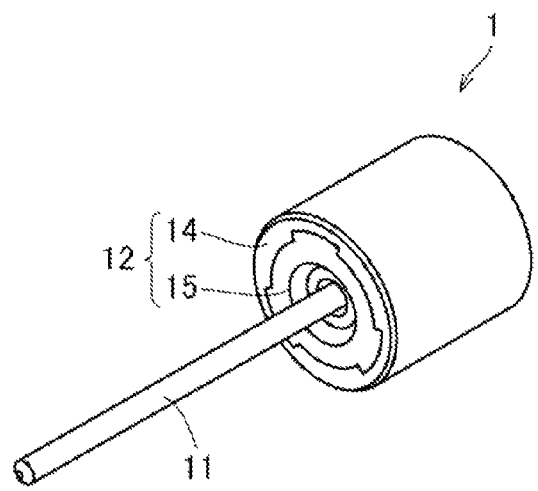
FIG. 2 is a perspective view showing a configuration of a rotor 1 and a stopper 61 shown in FIG. 1, which is seen from a side of a shaft 11.
Figure 3:
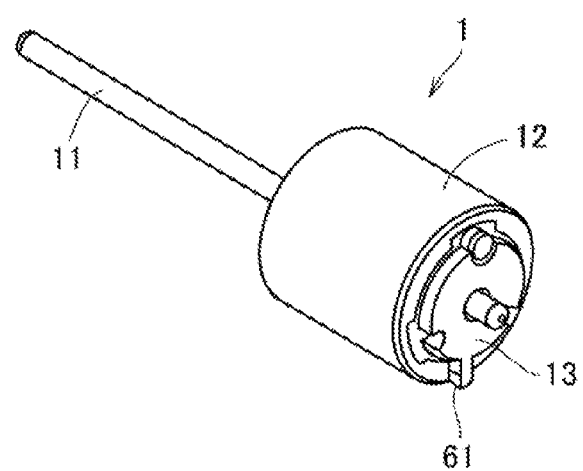
FIG. 3 is a perspective view showing the configuration of the rotor 1 and the stopper 61 shown in FIG. 1, which is seen from a side if a stopper 61.

FIGS. 2 and 3 are perspective views showing a configuration of the rotor 1 and the stopper 61 shown in FIG. 1. FIG. 2 is a perspective view seen from the side of the shaft 11 and FIG. 3 is a perspective view seen from the side of the stopper 61.

Referring to FIGS. 2 and 3, the shaft 11 is integrally formed with the magnet assembly 12 by resin. The magnet assembly 12 includes a magnet (magnetic poles) 14 and a resin mold part 15. The magnet 14 has a cylindrical shape and is arranged on an outer diameter side of the resin mold part 15. The magnet 14 is fixed to the shaft 11 via the resin mold part 15.

The stop plate 13 has a circular shape and includes the stopper 61 (a rotor-side position regulation part, a zero position part, a stop part, a position regulation part, a magnet-side rotation stopper, a protrusion part) at a part of an outer periphery thereof. The stopper 61 protrudes from the stop plate 13 toward the outer diameter side. The stopper 61 is fixed to the rotor 1 and rotated together with the rotor 1. The stop plate 13 is made of metal such as aluminum, resin and the like, for example. In FIGS. 2 and 3, the stop plate 13 (stopper 61) is separately formed from the rotor 1.

Figure 4A:
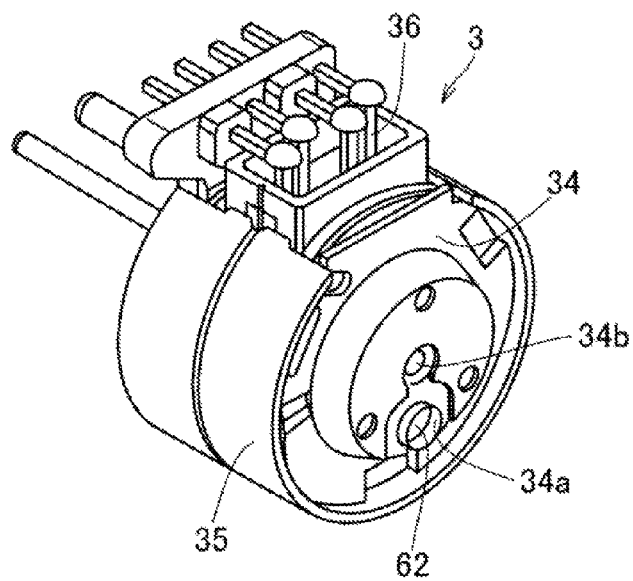
FIGS. 4A and 4B show a configuration of a stator 3 and a stud 62 shown in FIG. 1.
Figure 4B:
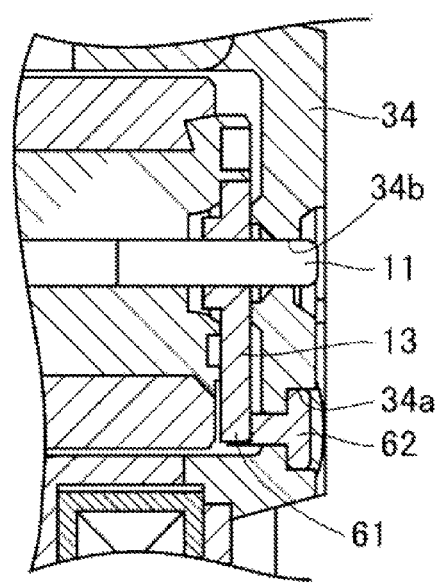

FIGS. 4A and 4B show a configuration of the stator 3 and the stud 62 shown in FIG. 1. Specifically, FIG. 4A is a perspective view, and FIG. 4B is an enlarged view of a vicinity of the stud 62 in FIG. 1.

Referring to FIGS. 4A and 4B, the end plate 34 has the hole 34b at the central portion and a hole 34a is formed just below the hole 34b. The stud 62 is inserted into the hole 34a. The stud 62 is separately formed from the end plate 34 and is fixed to the end plate 34. The stud 62 protrudes from the end plate 34 toward the rotor 1 in parallel with the shaft 11.

The stud 62 is made of metal such as aluminum, resin and the like, for example. When the stator 3 and the stud 62 has the configuration as shown in FIGS. 4A and 4B, the stud 62 may be fixed to the end plate 34 by inserting the stud 62 made of for example, aluminum into the hole 34a and then pressing the stud 62 with the end plate (cover) 34 being heated and melted. Also, when the stud 62 is made of resin, the stud may be fixed (thermal caulking) by inserting the stud 62 into the hole 34a and then melting a rear part of the stud 62 by heat. When the stopper 61 and the stud 62 are made of metal, it is possible to secure the strength and precision.

Next, operations of the stepping motor 100 are described.

Figure 5:
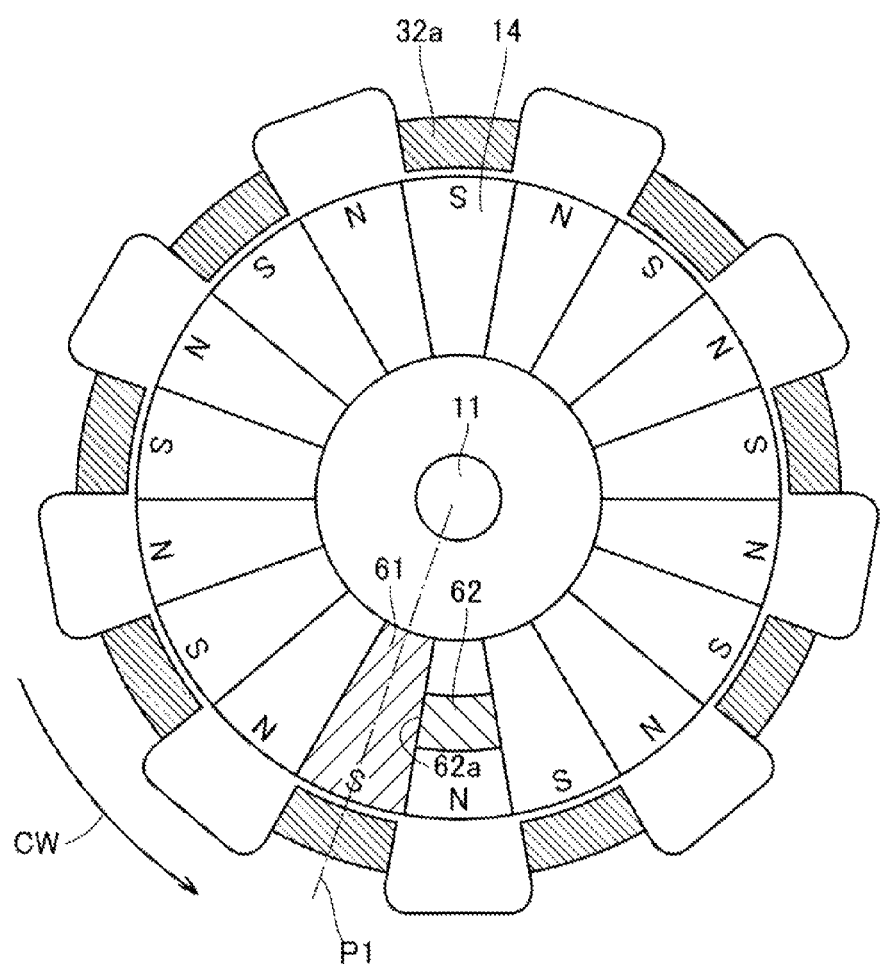
FIG. 5 schematically shows the rotor 1 at a state where rotation of the rotor is regulated in a CW direction.

FIG. 5 schematically shows the rotor 1 at a state where the rotation thereof is regulated in a CW direction. Meanwhile, in FIGS. 5 to 10, in order to show a positional relation between the stopper 61 and the stud 62 according to the rotation of the rotor 1, the stator teeth 32a and the stud 62 are shown together with the magnet 14 of the rotor 1.

Referring to FIG. 5, the operation is explained in a case where the rotor 1 has 18 poles, the number of steps is 36 and a rotating angle R of the rotor 1 is 320 degrees. When the rotor 1 is rotated in the CW direction, the stopper 61 is rotated to a left and lower position P1 in FIG. 1 and is thus brought into contact with one side face 62a of the stud 62. Thereby, the rotor 1 is regulated from being rotated in the CW direction at a state where the stopper 61 is located at the position P1.

Figure 6:
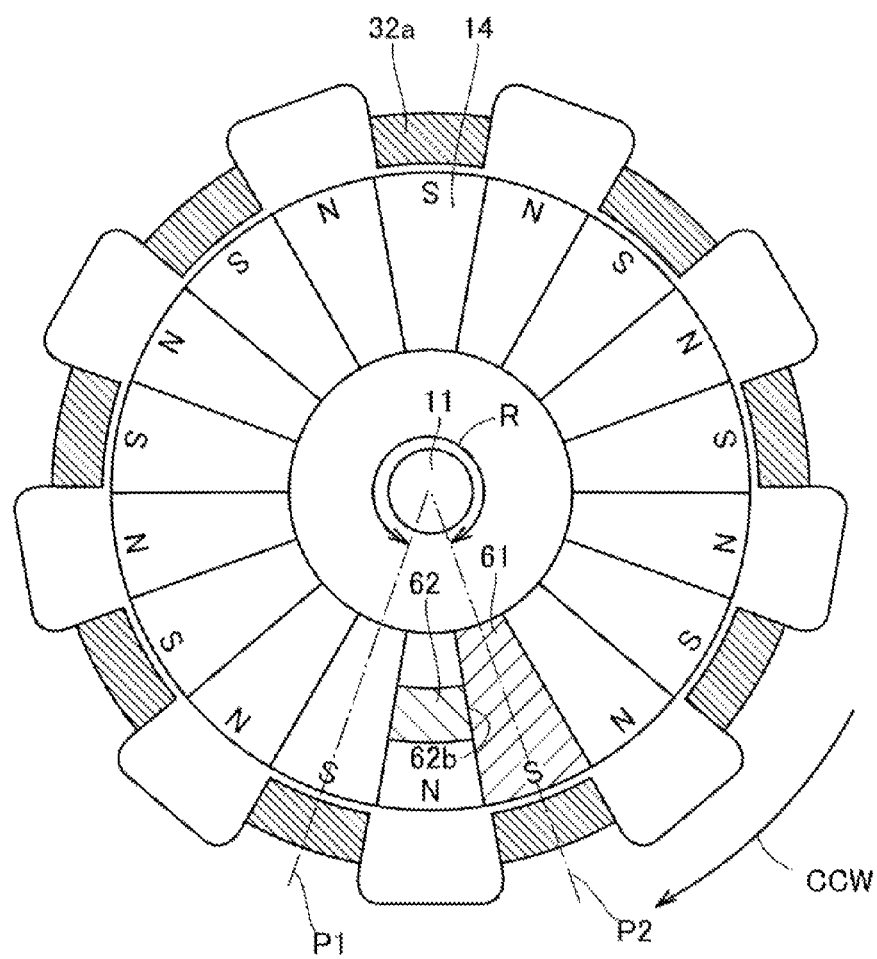
FIG. 6 schematically shows the rotor 1 at a state where rotation of the rotor is regulated in a CCW direction.

FIG. 6 schematically shows the rotor 1 at a state where the rotation thereof is regulated in a CCW direction.

Referring to FIG. 6, when the rotor 1 is rotated in the CCW direction, the stopper 61 is rotated to a right and lower position P2 in FIG. 1 and is thus brought into contact with the other side face 62b of the stud 62. Thereby, the rotor 1 is regulated from being rotated in the CCW direction at a state where the stopper 61 is located at the position P2.

The position P1 or P2 is preferably set such that the pointer attached to the shaft 11 indicates a reference position (for example, zero position) of the indicator board at a state where the rotor 1 is stopped by the stud 62. Hereinafter, the positions P1 and P2 may be referred to as zero positions of a meter (speedometer, tachometer and the like). The positions P1 and P2 are set by setting the rotating angle R of the stepping motor 100.

Next, a method of setting the rotating angle R of the stepping motor 100 is described.

Figure 7:
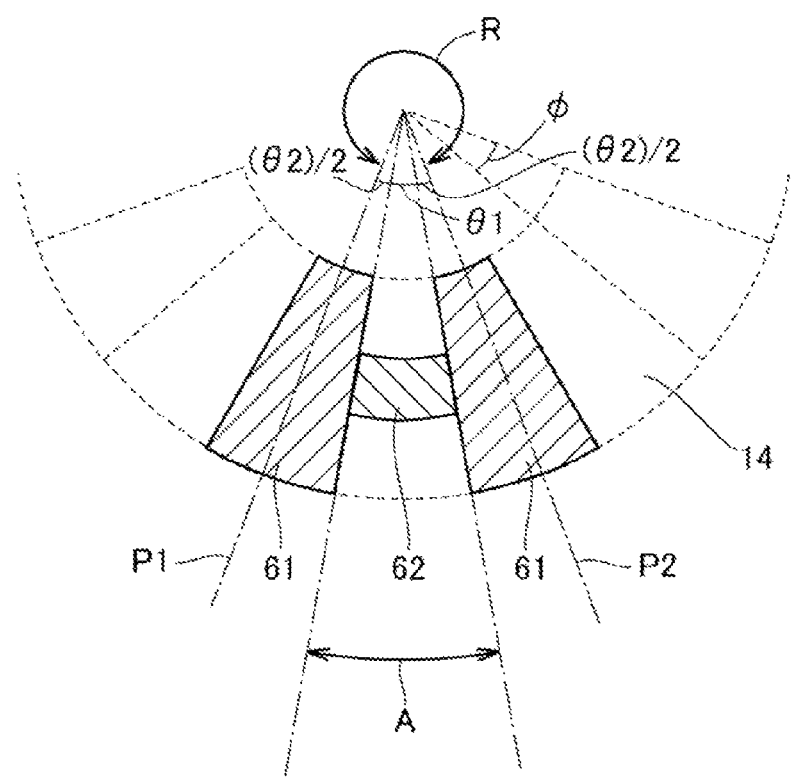
FIG. 7 schematically shows a relation between a rotating angle R and central angles occupied by the stopper 61 and the stud 62.

FIG. 7 schematically shows a relation between the rotating angle R and central angles occupied by the stopper 61 and the stud 62. In FIG. 7, for convenience of explanations, the stud 62 is shown at both positions P1 and P2.

Referring to FIG. 7, the rotating angle R can be set by central angles (widths) occupied by the stopper 61 and the stud 62. For example, when the central angle occupied by the stud 62 is θ1(°) and the central angle occupied by the stud 62 is θ2(°), the rotating angle R is expressed by a following equation (1).

$$\text{Rotating angle } R(°)=360-\{(θ2)/2+θ1+(θ2)/2\}=360-(θ1+θ2) \quad (1)$$

When the coil is energized to stop the rotation of the rotor with the stopper 61 being located at the closest position to the position P1 or P2, the stopper 61 and the stud 62 are preferably contacted. Thereby, it is possible to stably locate the stopper 61 at the zero position.

Specifically, for a two-phase stepping motor, for example, when one phase (for example, B-phase) is direct current energized, the stopper 61 is preferably stopped (the shaft 11 is not rotated, the pointer is not moved) at the position P1 or P2 (zero position). To this end, it is necessary to set the central angles θ1 and θ2 of the stopper 61 and the stud 62 in multiples of a central angle φ occupied by one pole of the magnet 14 such that the respective stator teeth 32a and the respective magnetic poles of the rotor 1 are opposed to each other at the front when the stopper 61 is stopped at the position P1 or P2. Specifically, the central angles are expressed by following equations (2) and (3), where n is a natural number.

$$θ1=A=360/((\text{the number of steps})/2)\times n \quad (2)$$

$$θ2=A=360/((\text{the number of steps})/2)\times n \quad (3)$$

In the respective central angles θ1 and θ2, the value of the natural number n may be the same or different. In this illustrative embodiment, a case where the value of n is 1 in the central angles θ1 and θ2 is shown.

Figure 8A:
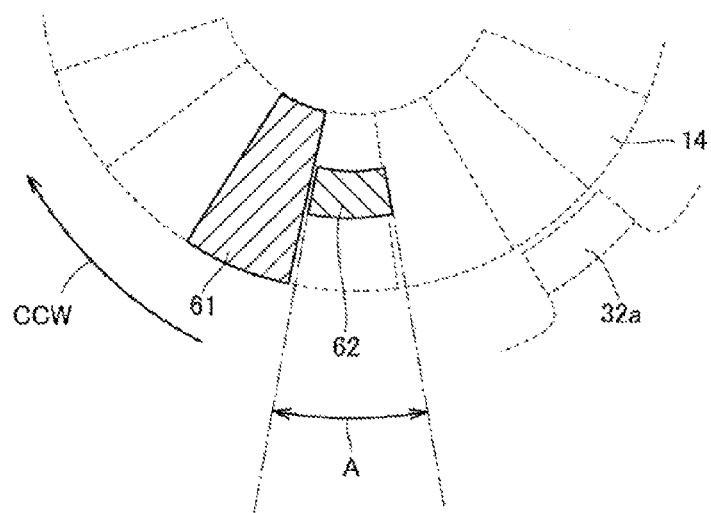
FIGS. 8A and 8B show a method of correcting a position of the stud 62 when a stable point position of the rotor 1 (magnet 14) is deviated in the CCW direction.
Figure 8B:
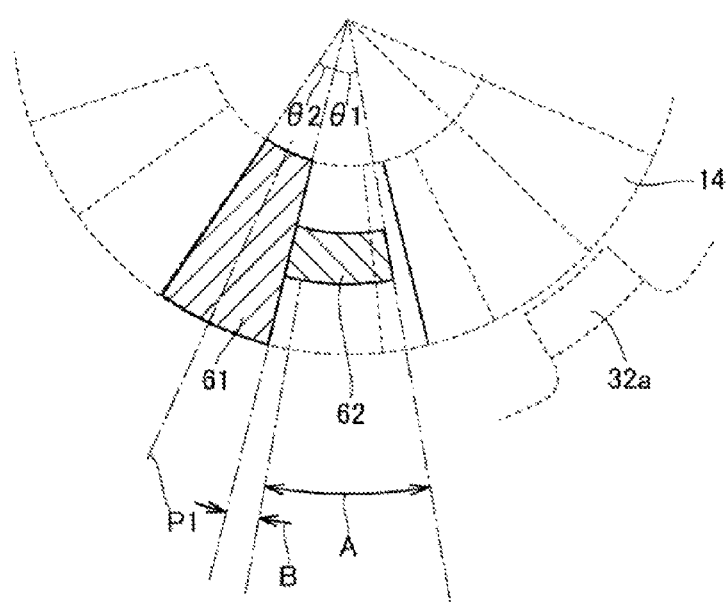

FIGS. 8A and 8B show a method of correcting a position of the stud 62 when a stable point position of the rotor 1 (magnet 14) is deviated in the CCW direction.

Referring to FIGS. 8A and 8B, when one phase (for example, B-phase) is direct current energized, the stable point position of each magnetic pole of the rotor 1 may be deviated from the center position of the stator teeth 32a due to stator magnetic saturation and the like. In FIG. 8A, the position of the rotor 1 is shown with the dotted line when each magnetic pole of the rotor 1 is located at the stable point. The stable point position of each magnetic pole of the rotor 1 is slightly deviated from the center position of the stator teeth 32a in the CCW direction. In this case, even when one phase (for example, B-phase) is direct current energized, the stopper 61 is not contacted to the stud 62, so that it is not possible to locate the stopper 61 at the zero position. Therefore, in order to stably locate the stopper 61 at the zero position, it is preferable to correct the respective central angles θ1 and θ2 to a value B(°). The correction of the respective central angles θ1 and θ2 to the value B(°) means that a sum of the central angle θ1 and the central angle θ2 is increased from (2A) to (2A+B). When the central angles θ1 and θ2 are respectively corrected to the value B, the central angles θ1 and θ2 are expressed by following equations (4) to (6).

$$A \leq \theta1 \leq A+B \quad (4)$$

$$A \leq \theta2 \leq A+B \quad (5)$$

$$\theta1+\theta2=2A+B \quad (6)$$

For example, when the central angle θ1 is set to be (A+B) with the central angle θ2 being set to be A, the width of the stud 62 is increased in the CCW direction, as shown in FIG. 8B, compared to the case shown in FIG. 8A. Thereby, even when the stable point position of the rotor 1 is slightly (as the central angle smaller than B) deviated in the CCW direction, the stopper 61 (pointer) is pushed and returned in the CCW direction by the stud 62, as the central angle corresponding to the value B. As a result, it is possible to securely locate the stopper 61 at the position P1.

Figure 9A:
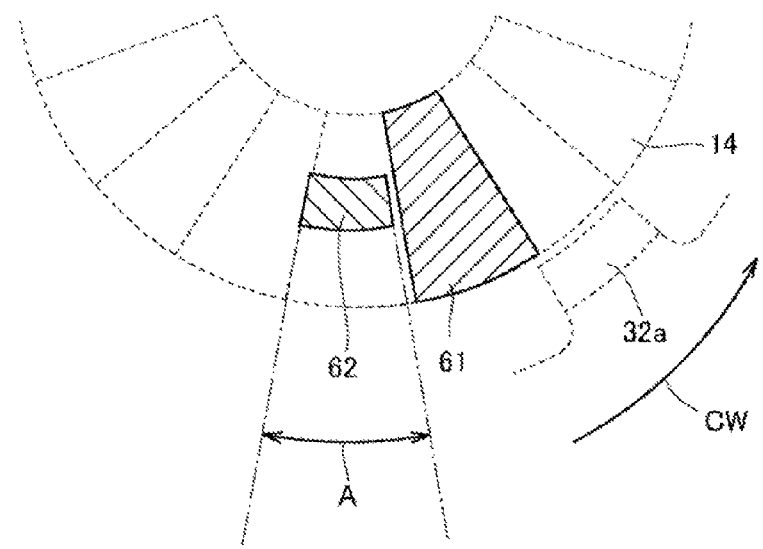
FIGS. 9A and 9B show a method of correcting a position of the stud 62 when the stable point position of the rotor 1 (magnet 14) is deviated in the CW direction.
Figure 9B:
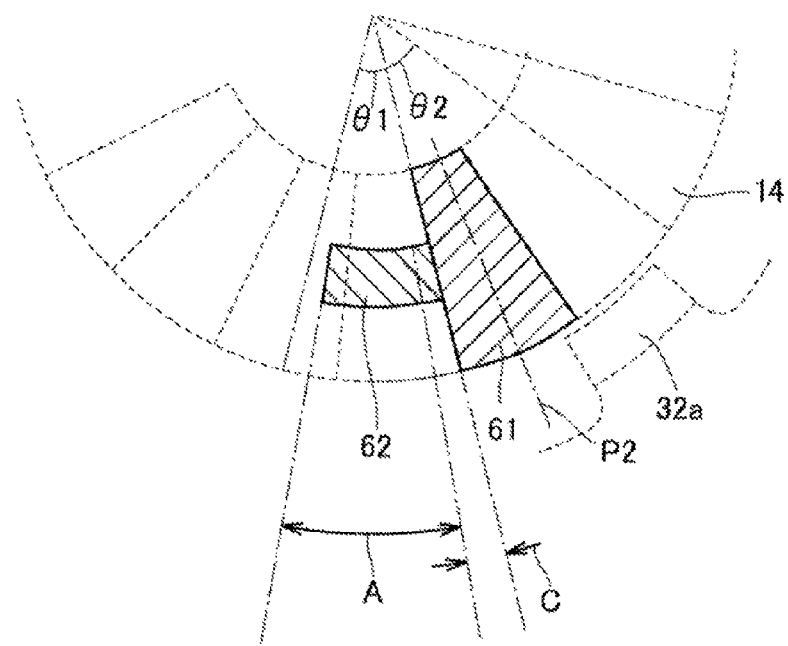

FIGS. 9A and 9B show a method of correcting a position of the stud 62 when the stable point position of the rotor 1 (magnet 14) is deviated in the CW direction.

Referring to FIG. 9A, the position of the rotor 1 is shown with the dotted line when each magnetic pole of the rotor 1 is located at the stable point. The stable point position of each magnetic pole of the rotor 1 is slightly deviated from the center position of the stator teeth 32a in the CW direction. In this case, even when one phase (for example, B-phase) is direct current energized, the stopper 61 is not contacted to the stud 62, so that it is not possible to locate the stopper 61 at the zero position. Therefore, in order to stably locate the stopper 61 at the zero position, it is preferable to correct the respective central angles θ1 and θ2 to a value C(°). The correction of the respective central angles θ1 and θ2 to the value C(°) means that a sum of the central angle θ1 and the central angle θ2 is increased from (2A) to (2A+C). When the central angles θ1 and θ2 are respectively corrected to the value C, the central angles θ1 and θ2 are expressed by following equations (7) to (9).

$$A \leq \theta1 \leq A+C \quad (7)$$

$$A \leq \theta2 \leq A+C \quad (8)$$

$$\theta1+\theta2=2A+C \quad (9)$$

For example, when the central angle θ1 is set to be (A+C) with the central angle θ2 being set to be A, the width of the stud 62 is increased in the CW direction, as shown in FIG. 9B, compared to the case shown in FIG. 9A. Thereby, even when the stable point position of the rotor 1 is slightly (as the central angle smaller than C) deviated in the CW direction, the stud 62 (pointer) is pushed and returned in the CW direction by the stud 62, as the central angle corresponding to the value C. As a result, it is possible to securely locate the stopper 61 at the position P2.

Hereinafter, the value B and the value C may be respectively referred to as a zero position standard. When the value B and the value C are the same, each of the value B and the value C becomes a half of a zero position standard range. Regarding a specific numerical value of the value B and the value C, 1.5(°) is set, for example.

Each of the central angles θ1 and θ2 may be corrected with both the value B and the value C. In this case, the central angles θ1 and θ2 are expressed by following equations (10) to (12). Thereby, the stopper 61 and the stud 62 have sizes satisfying the zero position standards.

$$A \leq \theta1 \leq A+B+C \quad (4)$$

$$A \leq \theta2 \leq A+B+C \quad (5)$$

$$\theta1+\theta2=2A+B+C \quad (6)$$

Figure 10:
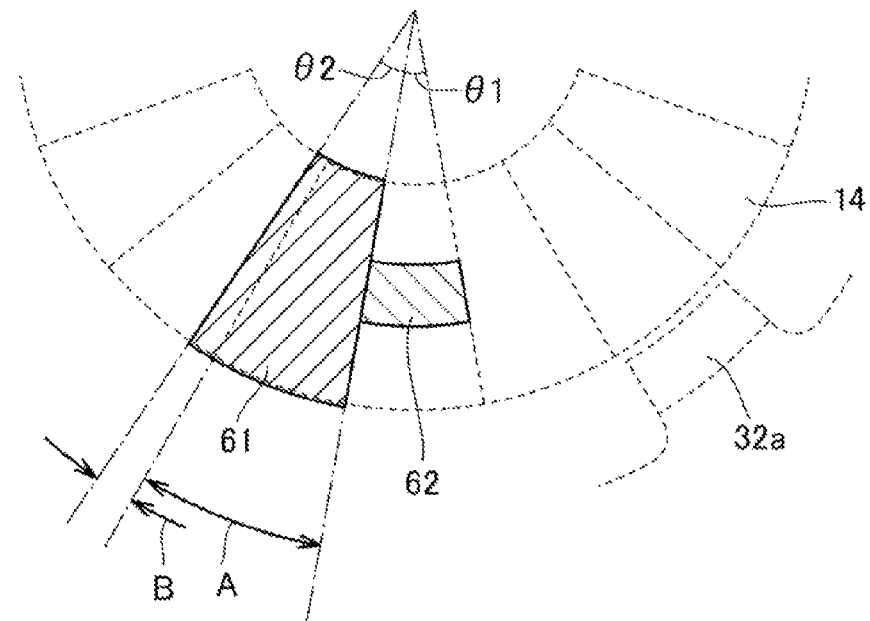
FIG. 10 shows a positional relation between the stopper 61 and the stud 62 when the stopper 61 is widened instead of the stud 62.

In FIGS. 8A, 8B, 9A and 9B, it is shown that the width of the stud 62 is increased so as to correct the value B or value C. However, for example, as shown in FIG. 10, the width of the stopper 61 may be increased, instead of the stud 62. In FIG. 10, the central angle θ2 is set to be (A+B) with the central angle θ1 being set to be A, so that the width of the stopper 61 is increased. Also, both widths of the stopper 61 and the stud 62 may be increased so as to correct the value B or value C.

In the meantime, the stopper 61 and the stud 62 are preferably arranged to have positions and widths with which the stopper 61 is pressed to the side of the stud 62 (minus side) so as for the pointer not to move from the zero position even when the stepping motor 100 is under non-energization state. When the stable point position of the rotor 1 is different between the non-energization state and the energization state, it is preferable to correct the value B and the value C, based on the stable point position at the non-energization state.

Figure 11:
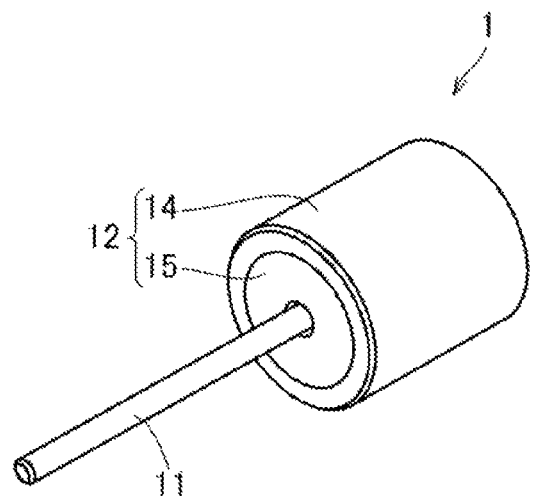
FIG. 11 is a perspective view showing a configuration of a modified illustrative embodiment of the rotor 1 and the stopper 61 shown in FIG. 1, which is seen from the side of the shaft 11.
Figure 12:
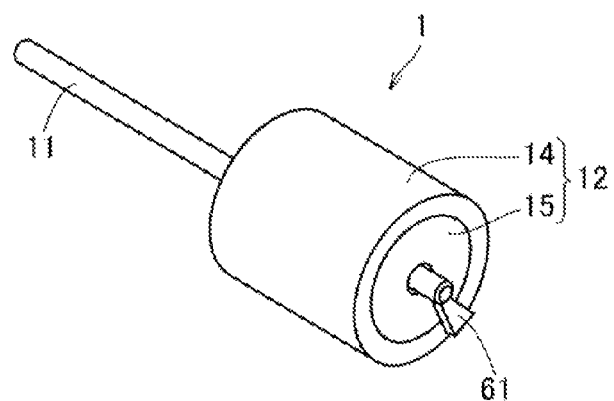
FIG. 12 is a perspective view showing the configuration of the modified illustrative embodiment of the rotor 1 and the stopper shown in FIG. 1, which is seen from the side of the stopper 61.

FIGS. 11 and 12 are perspective views showing a configuration of a modified illustrative embodiment of the rotor 1 and the stopper 61 shown in FIG. 1. FIG. 11 is a perspective view seen from the side of the shaft 11 and FIG. 12 is a perspective view seen from the side of the stopper 61.

Referring to FIGS. 11 and 12, the shaft 11 is integrally formed with the magnet assembly 12 by resin. The magnet assembly 12 includes the magnet 14 and the resin mold part 15. The magnet 14 has a cylindrical shape and is arranged on the outer diameter side of the resin mold part 15. The magnet 14 is configured by a plastic magnet and the like and is fixed to the shaft 11 via the resin mold part 15.

The stopper 61 protrudes from the magnet 14 toward the inner diameter side. The stopper 61 is injection-molded together with the magnet 14. By integrally forming the stopper 61 with the magnet 14, it is possible to reduce the number of the parts and to improve the assembling precision.

Figure 13A:
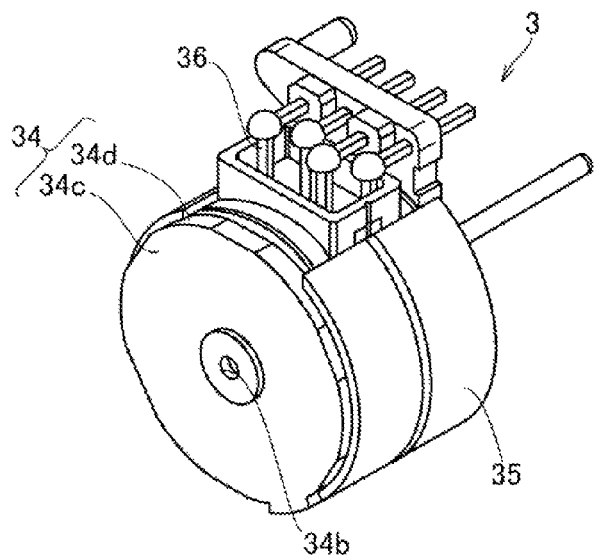
FIGS. 13A and 13B show a configuration of a modified illustrative embodiment of the stator 3 and the stud 62 shown in FIG. 1.
Figure 13B:
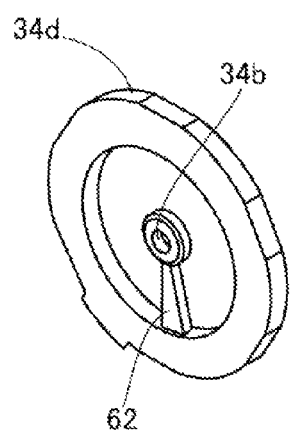

FIGS. 13A and 13B show a configuration of a modified illustrative embodiment of the stator 3 and the stud 62 shown in FIG. 1. Specifically, FIG. 13A is a perspective view and FIG. 13B is a perspective view partially showing a configuration of a cylindrical shape part 34d of the end plate 34.

Referring to FIGS. 13A and 13B, the end plate 34 has a cover part 34c which covers a side part of the magnet assembly 12 and the stop plate 13 and a cylindrical shape part 34d which is connected to the cover part 34c and is attached to the teeth part 32. The stud 62 protrudes from an inner wall of the cylindrical shape part 34d in the inner diameter direction. The stud 62 is integrally formed with the end plate 34.

Figure 14:
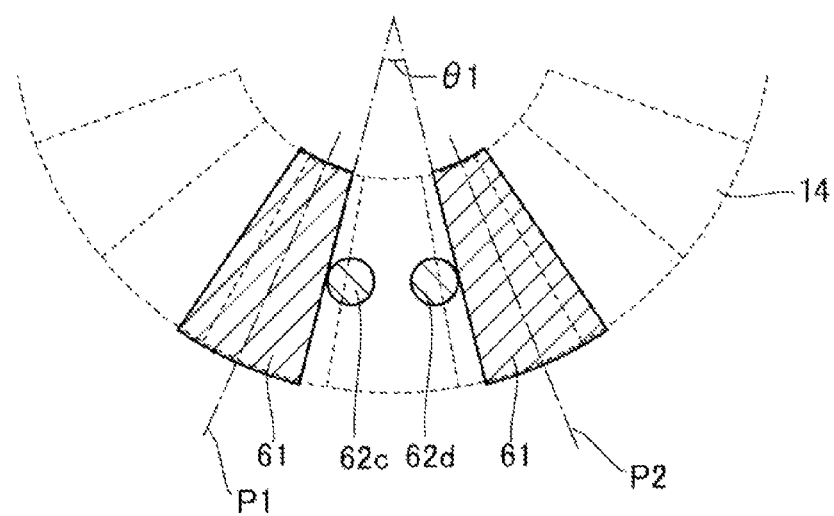
FIG. 14 shows a configuration of a modified illustrative embodiment of the stud 62 shown in FIG. 1.
Figure 15:
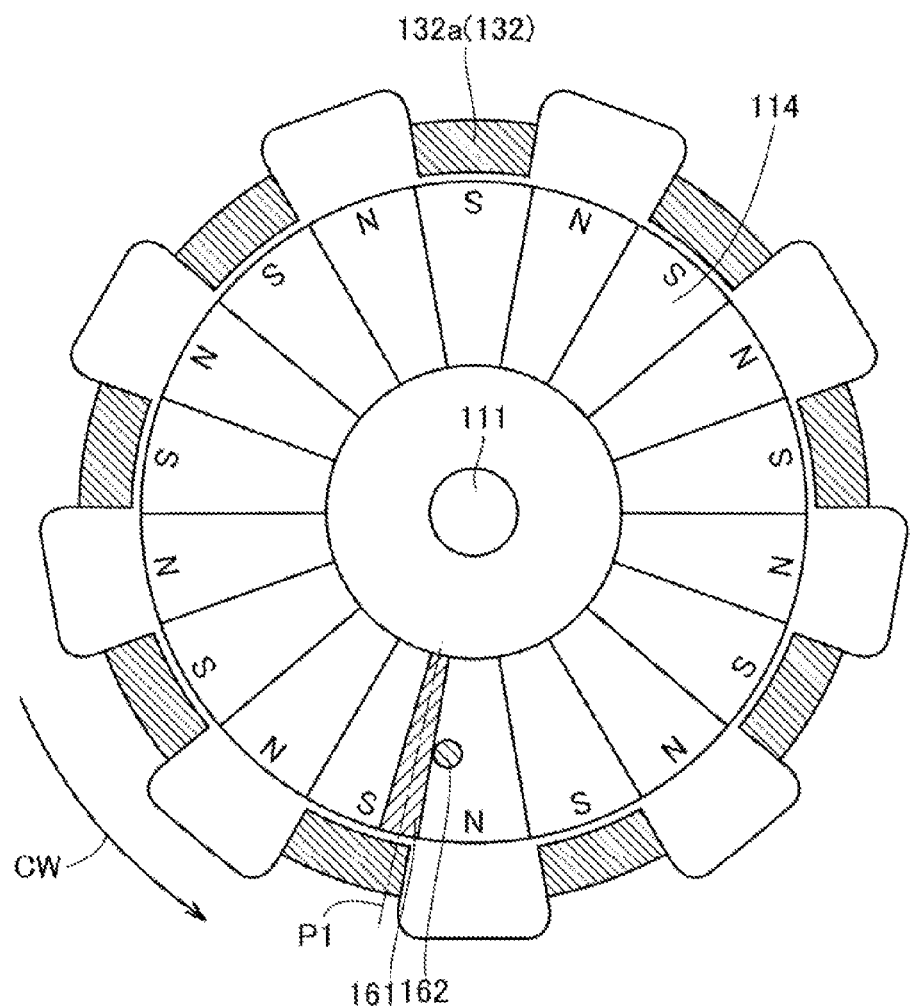
FIG. 15 shows a method of regulating rotation of a rotor in a CW direction in a related-art stepping motor.
Figure 16:
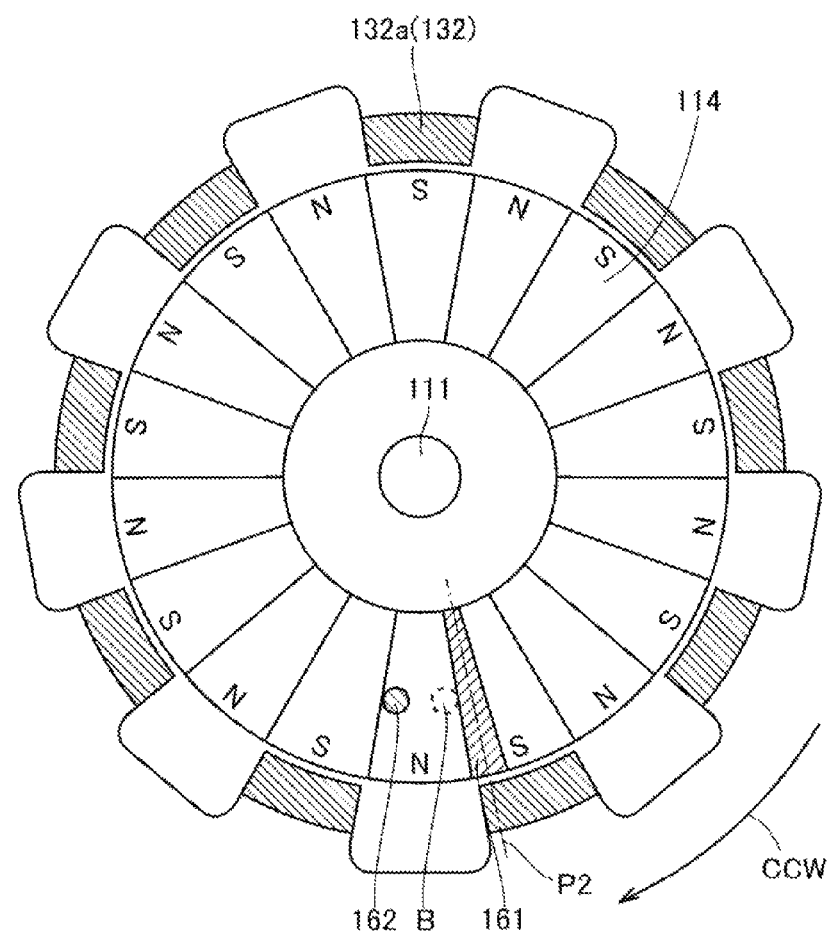
FIG. 16 shows a method of regulating rotation of a rotor in a CCW direction in a related-art stepping motor.

FIG. 14 shows a configuration of a modified illustrative embodiment of the stud 62 shown in FIG. 1. In FIG. 14, for convenience of explanations, the stopper 61 is shown at both the positions P1 and P2.

Referring to FIG. 14, the stud 62 may be configured by two pins (thin pins) 62c, 62d which are provided within a range of the central angle θ1. In this case, the stopper 61 is regulated from being rotated in the CW direction by the pin 62c with being at the position P1 and from being rotated in the CCW direction by the pin 62d with being at the position P2.

Regarding the shapes of the stopper 61 and the stud 62, arbitrary shapes such as fan shape, circular shape, elliptical shape, angled shape and the like may be adopted and shapes capable of securing the mass production and precision of the stepping motor 100 can be adopted. Also, the numbers of the stopper 61 and the stud 62 are not limited.

[Effects of Illustrative Embodiments]

According to the above illustrative embodiments, the stopper 61 is regulated from being rotated in the CW direction by the side face 62a of the stud 62 or the pin 62c with being at the position P1 and from being rotated in the CCW direction by the side face 62b of the stud 62 or the pin 62d with being at the position P2. Thereby, it is possible to select any direction (CW direction or CCW direction) regarding the attachment direction of the pointer, without changing the attachment direction of the stepping motor 100. As a result, the degree of freedom in the arrangement of the stepping motor, the pointer and the like is improved. Also, it is possible to provide the stepping motor which properly operates even when the attachment position of the pointer is at any of one side and the other side.

Also, when the coil is energized to stop the rotation of the rotor with the stopper 61 being located at the closest position to the position P1 or P2, the stopper 61 and the stud 62 are contacted to each other, so that it is possible to stably locate the stopper 61 at the zero position.

[Others]

In the above illustrative embodiments, the stepping motor is a shaft rotary type and inner rotor type. However, the stepping motor of the invention may be a shaft fixed type motor or a shaft rotary type and outer rotor type motor, in addition to the above motor. Also, the stepping motor of the present invention may be a flat-type motor.

The rotary shaft may be a shaft having a hollow part. In this case, it is possible to illuminate the pointer by guiding light, which is emitted from a light source arranged at the opposite side (for example, the right side in FIG. 1) to the pointer, to the pointer through the hollow part.

The above illustrative embodiments may be appropriately combined. For example, the stator shown in FIGS. 13A and 13B may be combined with the rotor shown in FIGS. 2 and 3. Also, the stator shown in FIGS. 4A and 4B may be combined with the rotor shown in FIGS. 11 and 12.

It should be noted that the above illustrative embodiments are exemplary and are not limitative. The scope of the invention is defined in the claims, not in the specification, and is intended to include the equivalent meaning to the claims and all modification within the claims.

What is claimed is:

1. A stepping motor comprising:
a stator assembly which is configured in a two-phase structure including two stators, each having at an inner circumference thereof a plurality of pole teeth in two arrays arranged oppositely to each other and a coil, the two stators being coupled together;
a rotor which is disposed rotatably inside the stator assembly, the rotor comprising a shaft, a resin mold portion and a tubular magnet disposed on an outer circumference of the resin mold portion;
an end plate disposed on one end of the two stators, and having an opening for rotatably supporting the shaft, wherein the end plate has a position regulation member which protrudes from the end plate toward the rotor; and
a front plate disposed on other end of the two stators, and having an opening for rotatably supporting the shaft,
wherein a stop plate having a stopper is fixed to the shaft, and disposed at one end of the resin mold portion, and
wherein the stopper regulates a rotation of the rotor in a circumferential direction by contacting with the position regulation member.

2. The stepping motor according to claim 1,
wherein the end plate has a hole in which a portion of the position regulation member is fitted.

3. The stepping motor according to claim 1,
wherein the position regulation member is integrally formed with the end plate.

4. The stepping motor according to claim 1,
wherein the magnet is configured by a plastic magnet, and the stopper is integrally formed with the plastic magnet by injection-molding.

5. The stepping motor according to claim 1,
wherein the shaft has a hollow portion for guiding a light.

6. The stepping motor according to claim 1,
wherein when the motor is under non-energization state, a position of the stopper having contacted with the position regulation member is maintained.

7. The stepping motor according to claim 1, wherein an end of the shaft disposed away from the rotor is configured to have a pointer attached thereto.

8. The stepping motor according to claim 1,
wherein the position regulation member occupies a center angle $\theta 1$, and the stopper occupies a center angle $\theta 2$, and wherein a rotatable angle R (°) of the rotor is expressed by R=360−($\theta 1$ +$\theta 2$).

9. The stepping motor according to claim 8,
wherein the magnet has a plurality of poles arranged in a circumferential direction of the rotor, each of the poles occupies a center angle $\phi$, and wherein the each of the center angle $\theta 1$ and the center angle $\theta 2$ is a multiple of the center angle $\phi$.

10. The stepping motor according to claim 8, wherein the magnet has a plurality of poles arranged in a circumferential direction of the rotor, each of the poles occupies a center angle $\phi$, and wherein the each of the center angle $\theta 1$ and the center angle $\theta 2$ is equal to the center angle $\phi$.

11. The stepping motor according to claim 8, wherein the stepping motor is used for a meter.

12. A meter including the stepping motor according to claim 1.

* * * * *